Dec. 15, 1942.  K. O. KEEL ET AL  2,304,928
SHIP DRIVE AND CONTROL SYSTEM
Filed June 30, 1941  5 Sheets-Sheet 3

Inventors
Knut O. Keel,
Charles H. Fike &
William E. Brill.
By
Blackmore, Sewer & Flint
Attorneys

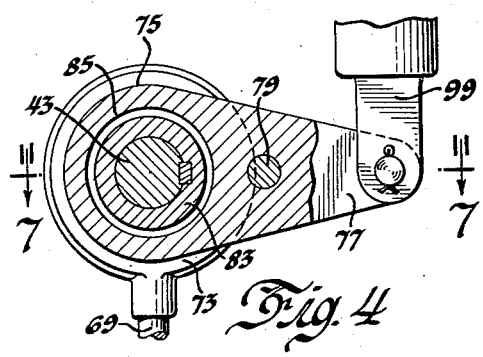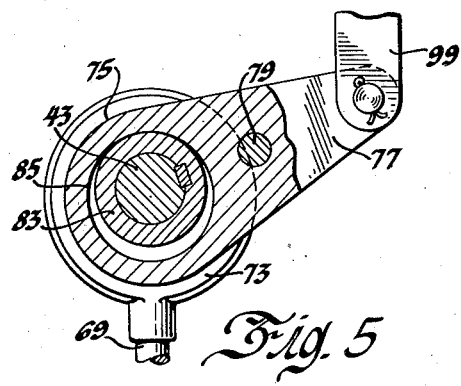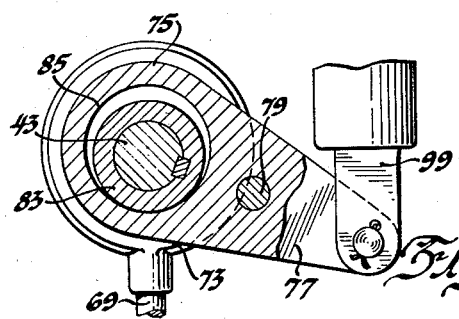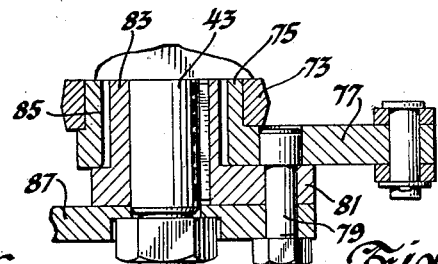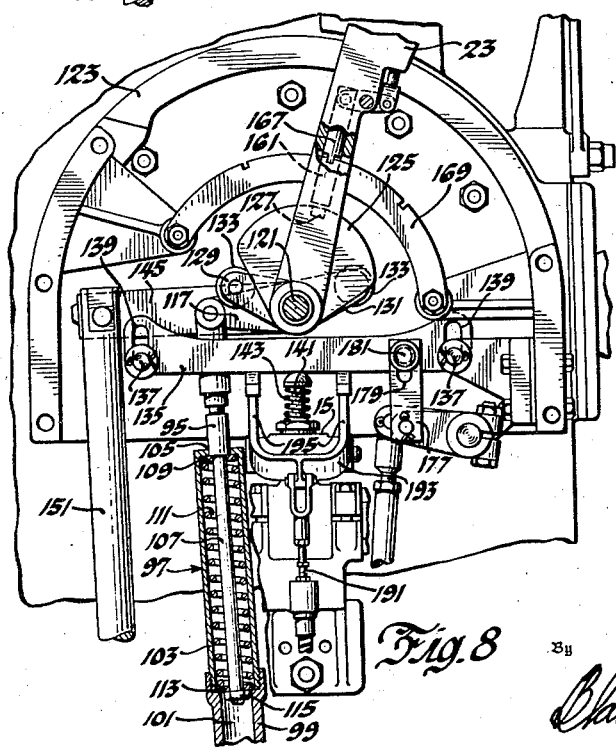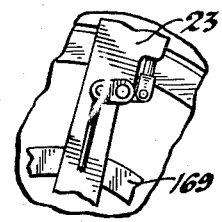

Patented Dec. 15, 1942

2,304,928

UNITED STATES PATENT OFFICE 2,304,928

SHIP DRIVE AND CONTROL SYSTEM

Knut O. Keel, Charles H. Fike, and William E. Brill, Cleveland, Ohio, assignors to General Motors Corporation, Detroit, Mich., a corporation of Delaware Application June 30, 1941, Serial No. 400,482

10 Claims. (Cl. 60—16)

The present invention relates generally to prime mover control mechanisms and more particularly to a control mechanism for controlling the starting, reversing, braking and speed and torque varying means of a prime mover of the Diesel type.

The principal object of the invention is the provision of control mechanism whereby the torque, speed and direction of rotation and also the starting and braking of a Diesel prime mover may be instantaneously and conveniently controlled either directly by manually operable control means or by power operated remotely controlled means.

Another object is the provision of auxiliary hand operated engine reversing and engine turning means interlocked with the above mentioned manually operable means and also with the power operated means to insure proper operation of any one of these means and to prevent operation of and damage to the means not in use.

The above and other objects and features of our invention will be better understood by referring to the following detailed description and the accompanying drawings illustrating one form of our invention which is particularly adapted for controlling reversible Diesel engines having the necessary characteristics for driving the propulsion equipment of ships in either direction and at variable speed.

Figure 1 of the drawings shows a fragmentary side elevation of a Diesel prime mover for a ship with various controls therefor.

Figure 2 of the drawings is an end elevation of the prime mover shown in Figure 1 showing certain of the controls to better advantage.

Figures 4, 5 and 6 are enlarged detail views of the follow-up mechanism shown in Figure 1 with certain of the elements thereof in different positions.

Figure 7 is a cross sectional view taken on line 7—7 of Figure 4.

Figure 8 is an enlarged cross sectional view of the engine control stand taken on line 8—8 of Figure 3.

Figure 9 is a detail of the lever mechanism shown in Figure 8.

Figure 1:
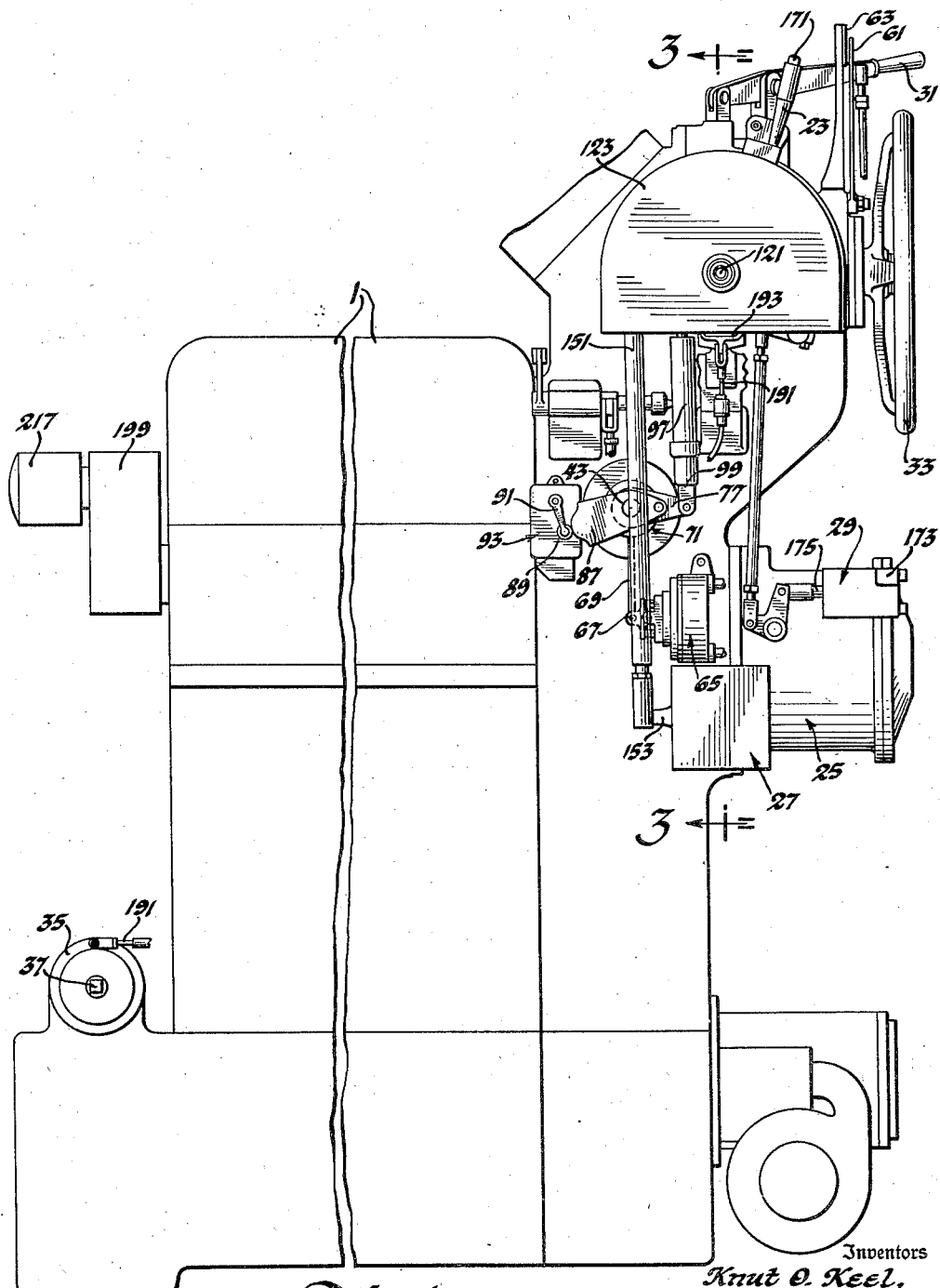
Figure 2:
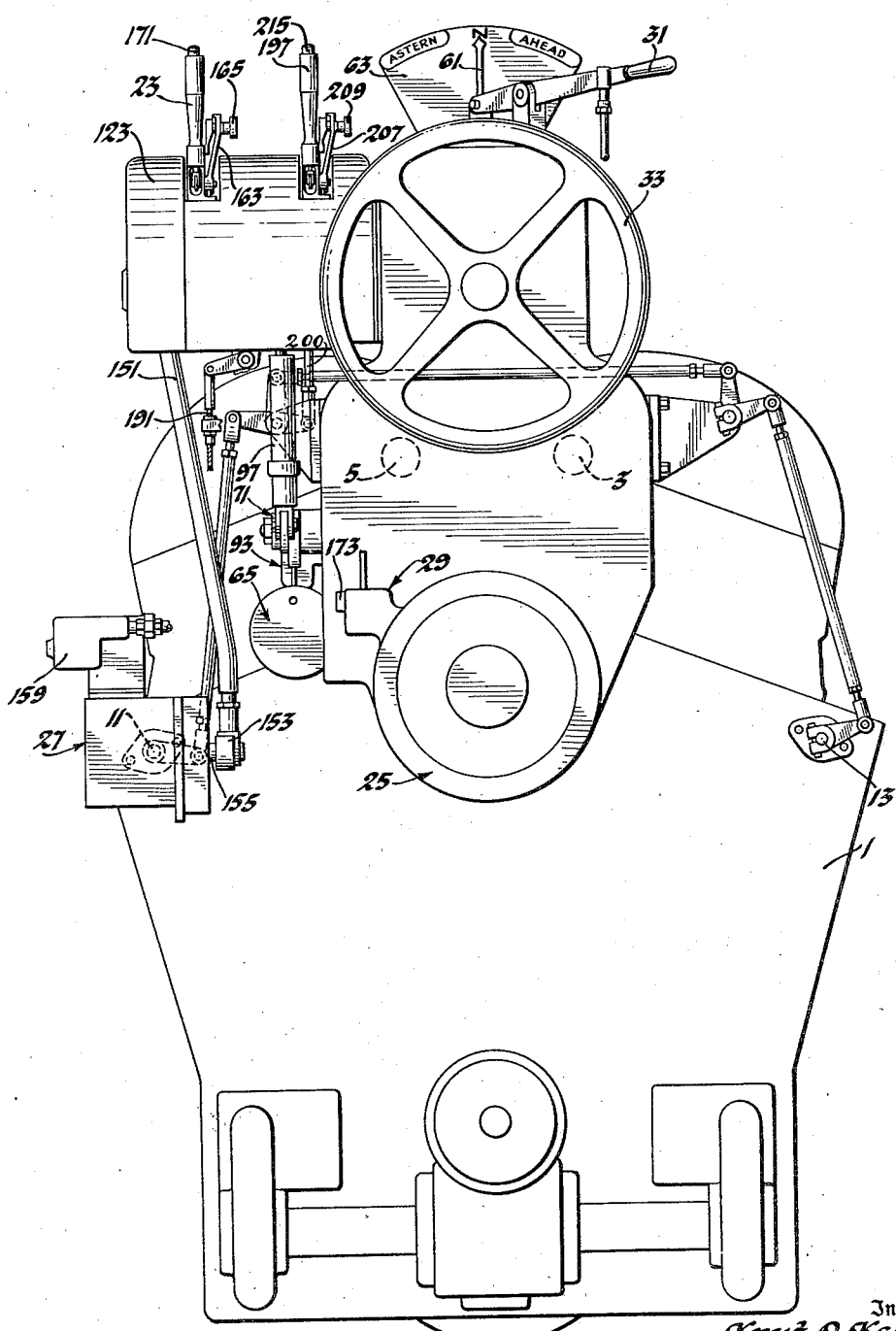

Referring to Figures 1 and 2 of the drawings, an air started, solid injection, multiple cylinder, V-type, reversible Diesel prime mover is shown generally at 1. The prime mover or engine may be directly connected to drive a ship's propeller shaft or connected thereto through fluid or electrical couplings and/or reduction gearing as desired. The propulsion equipment includes braking means of any well known type for promptly stopping rotation of this equipment and also the engine connected thereto to reduce the time required for reversing the engine and ship. The propulsion and braking equipment included therein is not shown.

Figure 3:
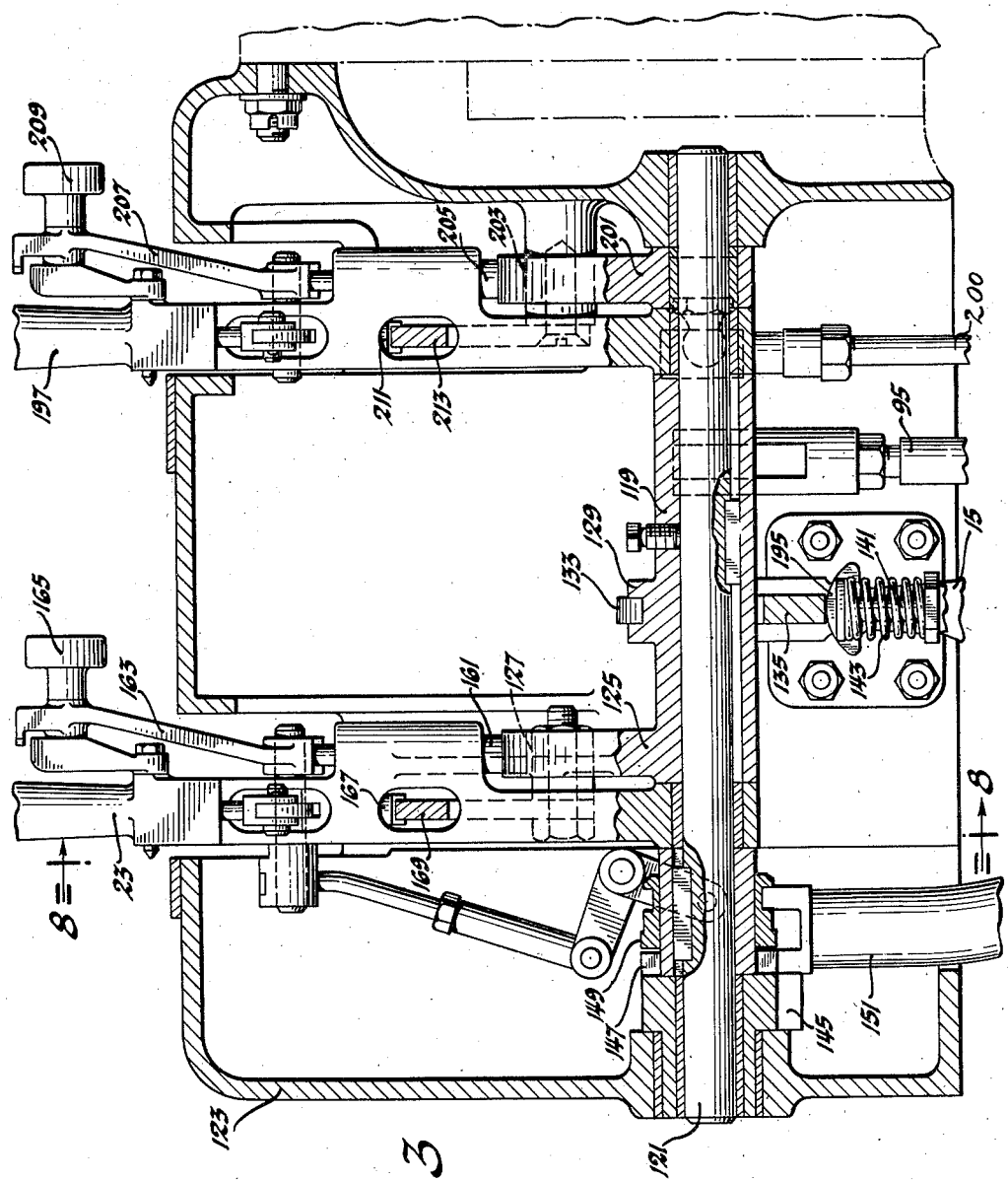
Figure 3 is an enlarged fragmentary cross sectional view of the engine control stand taken on line 3—3' of Figure 1.
Figure 10:
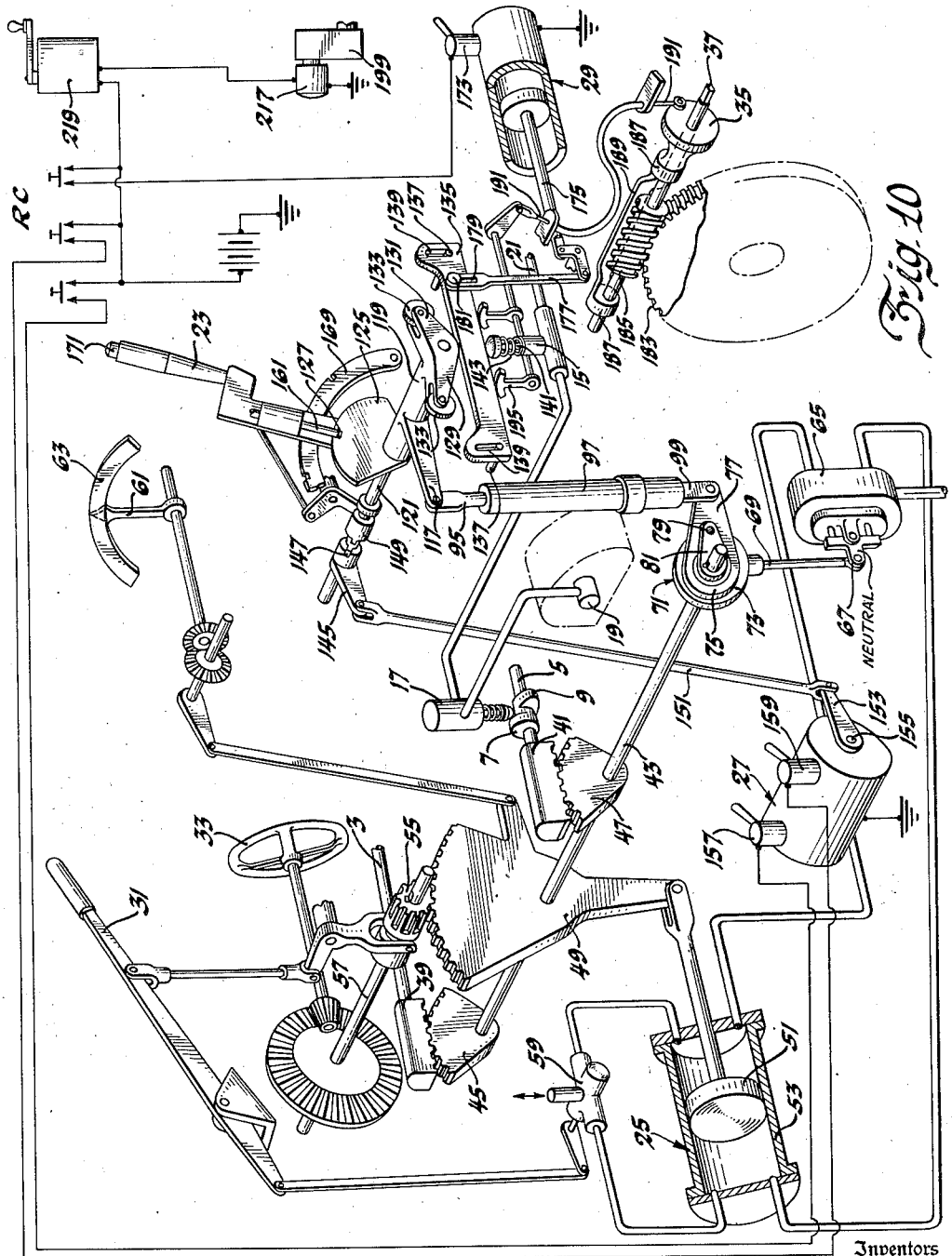
Figure 10 is a perspective view showing the complete control system in schematic form.

As best shown in Figures 2 and 10, the prime mover or engine 1 is provided with two axially shiftable camshafts 3 and 5, one rotatably supported in each cylinder bank, and each camshaft is provided with forward and reverse cams such as shown at 7 and 9 in Figure 10 for operating the engine valve mechanisms and fuel injection mechanism for the individual cylinders, not shown, in a well known manner to permit the engine to be started by compressed air for normal operation of the engine in either direction of rotation to drive the ship ahead or astern. The engine is also provided with two fuel injector control shafts 11 and 13 shown best in Figure 2. Each control shaft is rotatably supported in a respective bank of cylinders, and the individual cylinder fuel injectors, not shown, in each bank of cylinders are operably connected to the control shafts in any well known manner whereby, when the shafts are rotated, the amount of fuel and time of injection may be varied in conventional manner so that the speed, torque and output of the engine may be varied. The means for simultaneously rotating the two injector control shafts will be described later. The means for starting and reversing the engine is best shown in Figures 3, 8 and 10, and will now be described in detail. A starting air valve is shown at 15, and individual engine cylinder air timing valves, one of which is shown at 17 operated by forward and reverse cams 7 and 9 on the camshaft, and also individual cylinder check valves, one of which is indicated at 19, are provided to admit air to each of the engine cylinders through a supply pipe 21 connected to an air reservoir, not shown, to cause rotation of the engine in either direction. A manually operable engine air starting and reversing control lever 23 shown in Figures 1, 2, 3, 8 and 10 is provided for operating the air starting valve and for controlling a reversible air operated servo mechanism mounted on the engine shown generally at 25, which shifts the engine camshafts to cause reversal of the engine for starting of the engine by air to permit normal operation of the engine in either direction of rotation to drive the ship ahead or astern.

The air operated reversible servo mechanism may also be controlled by a remotely controlled electropneumatic device or servo mechanism shown generally at 27, and the air starting valve may also be controlled by a separate remotely controlled electropneumatic actuator shown generally at 29. Either of these two electropneumatic means may be controlled in a well known manner from a remote control position located in any part of the ship by electrical control switches, one remote control position being indicated at RC in Figure 10.

Hand operated engine reversing and engine turning gears are also provided. The hand operated reversing gear is engaged or disengaged by a hand lever 31 and is operated by a hand wheel 33. The hand lever 31 and hand wheel 33 are shown in Figures 1 and 2 mounted on the engine adjacent the air starting and reversing control lever 23. The engine turning gear is located on the opposite or flywheel end of the engine and is engaged and disengaged by a hand wheel 35 and operated by a rotatable shaft 37; see Figures 1 and 10.

The above mentioned engine starting, reversing and turning means and also interlocking means connecting these means are best shown in Figures 1, 3, 8 and 10, and the details of all these means, together with engine braking means, will now be described.

As best shown in Figure 10, racks 39 and 41 are mounted on one end of each of the engine camshafts having suitable internal projecting thrust surfaces, not shown, extending into suitable grooves, not shown, formed on the camshafts to move the camshafts axially to reverse the engine and to allow the camshafts to rotate with respect to the racks. The racks are connected by a cross shaft 43 having sector gears 45 and 47 fixed thereto which mesh with the racks. A lever 49 is also fixed to the cross shaft, the lower end of which is shown connected to a piston 51 movable in a cylinder 53 of the reversible air operated servo mechanism 25, and the arcuate upper end portion of the lever 49 is shown provided with gear teeth. A pinion 55 shown adjacent the upper end of the lever 49 is keyed on a shaft 57 which is rotated through the gearing shown by the engine reversing hand wheel 33. The pinion 55 may be moved into or out of mesh with the gear teeth on the lever 49 by the linkage shown connecting the pinion 55 with the hand lever 31. In order that the engine may be reversed easily by operation of the hand wheel 33 a bleed valve 59 having individual pipe connections with both ends of the cylinders is provided to allow air to enter and leave both ends of the cylinder when the bleed valve is opened, suitable linkage also being shown connected between the valve and hand lever 31 to cause the valve to be opened only when the lever is moved to engage the pinion 55 with the teeth on the lever 49. Suitable linkage such as that shown is connected to the lever 49 for moving an indicator or pointer 61, pivoted on the engine adjacent a fixed dial 63 to indicate ahead or astern positioning of the engine camshafts upon movement of the lever 49 by the servo piston 51 to either end of the cylinder. The above described elements of the hand reversing gear are all mounted on the engine in any convenient manner as best shown in Figures 1 and 2.

Movement of the piston 51 in either direction in the servo cylinder 53 from the central or neutral position, as shown in Figure 10, shifts the engine camshafts to cause ahead or astern rotation of the engine. Movement of the piston between the central or neutral position and either the ahead or astern position at either end of the cylinder is controlled by a valve mechanism shown generally at 65 in Figures 1 and 10, it of course being necessary to both disengage the pinion 55 from the gear teeth on the lever 49 and to close the bleed valve 59 by upward movement of the hand lever 31 to render the servo operative and permit air to force the piston in either direction in the servo cylinder. The valve mechanism 65 is of a well known type having valves and openings which permit air pressure from a reservoir, not shown, to enter either end of the cylinder through either of the pipe connections shown connecting the valve mechanism with the ends of the cylinder, and allow the exhaust of air from either opposite end of the cylinder. The valve mechanism operating lever 67 is shown pivoted on the housing of this valve mechanism and is connected by a link 69 to a follow-up mechanism, shown generally at 71 in Figures 1 and 10, the details of which are shown in Figures 4, 5, 6 and 7. The upper end of the link 69 is connected to a collar 73 carried on the hub 75 of a lever 77 pivotally supported on a fulcrum pin 79 supported on a lever 81. The hub portion 83 of the lever 81 is fixed on the cross shaft 43 and extends into a bore 85 in the hub of the lever 77. This bore is of greater diameter than the hub portion 83 of the lever 81 to permit the lever 77 to move angularly on the pin 79 and move the collar 73, link 69 and valve operating lever 67. When the bore 85 of the lever 77 is concentric with the hub portion 83 of the lever 81, as shown in Figure 4, the valve operating lever is in a neutral position as shown in Figure 10 and the valves in the valve mechanism are positioned so that admission and exhaust of air at both ends of the servo cylinder are prevented to stop movement of the piston in the central or neutral position in the cylinder as shown.

As best shown in Figure 5, movement of the outer end of lever 77 upward from the neutral position in which it is shown in Figure 4 or counterclockwise about the fulcrum pin 79 causes downward movement of the hub 75 of this lever and therefore downward movement of the collar 73 carried thereon and of the link 69 connected between the collar and valve operating lever 67 to cause this lever to be moved counterclockwise to the ahead position to cause compressed air to be admitted to the left end of the servo cylinder and cause air trapped in the other end of the cylinder to be exhausted therefrom. The piston 51 will accordingly be moved to the right, causing the lever 49, cross shaft 43, and lever 81 of the follow-up mechanism to move counterclockwise and follow the initial movement of the lever 77 about the fulcrum pin 79 until this lever is stopped. Counterclockwise movement of the lever 81 and pin 79 will continue, however, until the pin causes upward movement of the hub 75 of the lever 77 about the outer end thereof, which when held stationary causes the bore 85 of the lever 77 to move upward into concentric relation with the hub 83 of the lever 81. Upward movement of the hub 75, collar 73 and link 69 moves the valve operating lever 67 back to the neutral position and cuts off compressed air to the left side of the cylinder and also stops exhaust of air from the other side of the cylinder, stopping movement of the piston when the piston has moved to the right an amount necessary to shift the engine camshafts to cause ahead rotation of the engine. It will be evident that if the outer end of the lever 77 is moved downward from the neutral position as shown in Figure 4 to the position shown in Figure 6 opposite movement of the elements of the follow-up mechanism, valve operating lever and servo piston will occur in the same sequence to cause reverse movement of the piston to the left or opposite end of the cylinder to cause astern rotation of the engine. The servo piston may also be stopped in the neutral position in the same manner if the outer end of the lever 77 is moved to the neutral position as shown in Figure 4 from either the ahead position or astern position, shown respectively in Figures 5 and 6.

It will be noticed that a cam 87, shown best in Figures 1 and 7, is also fixed to the cross shaft 43 for moving a cam follower roller 89 rotatably mounted on an operating arm 91 of an electrical braking switch or control mechanism shown generally at 93. The operating arm is biased in any well known manner to cause the roller and switch operating arm to follow movement of the cam at all times. The mounting of the cam and elements of the follow-up mechanism are arranged on the cross shaft 43 as best shown in Figure 7. When the cam is in the neutral position as shown in Figure 1 the roller 89 is on the high part of the cam and the switch mechanism is closed to energize any well known type of electrically actuated control mechanism for applying a brake to the propulsion equipment connected to and driven by the engine to stop rotation of both the propulsion equipment and engine. The low portions of the cam on either side of the high central portion allow the roller and switch arm to move to the off position only when the camshafts of the engine have been moved to either the astern or ahead position, in which positions only, the brake is released from the propulsion equipment to permit rotation thereof by the engine.

The outer end of the lever 77 of the follow-up mechanism is connected to one end of a link 95, which includes a resilient connection 97, the construction of which is best shown in Figure 8, to permit relative movement of the ends of the link.

The lower end 99 of the resilient connection is bored out at 101 and is threaded on the upper hollow cylindrical member 103 of the connection having an opening 105 in the top to permit the link 95 to slide therein. The lower end portion 107 of the link is of smaller diameter than the opening, and a washer 109 of greater diameter than the opening is retained in contact with either the shoulder on the link or the upper end surface of the cylindrical member by a compression spring 111 surrounding the reduced diameter portion of the link and retained thereon by a washer 113 and a nut 115 threaded on the lower end of the link. The washer 113 is of greater diameter than the bore 101 in the lower end 99 of the connection which is held in contact with a shoulder adjacent the bore and nut 115.

With the above construction it will be apparent that relative endwise movement between the upper end of the link 95 and the lower end 99 of the connection 97 is permitted, the spring 111 being compressed for relative movement in either direction of the link with respect to the lower end of the connection and the force being applied to either washer which is resisted by the spring and other washer.

The upper end of the link 95 is connected with an arm 117 formed integral with a sleeve 119, as best shown in Figures 3 and 10. The sleeve is keyed to a shaft 121 rotatably supported in the engine control stand 123 shown generally in Figures 1 and 2 and in detail in Figures 3, 8 and 10. The sleeve is also provided with an upstanding portion 125 having a slot 127 cut therein and arms 129 and 131 extending outwardly horizontally in opposite directions at right angles from the axis of the sleeve, and in the ends of each of the arms a roller 133 is rotatably supported. A floating lever 135 is located directly below and in the plane of these rollers by means of pins 137 fixed to the control stand which project through slots 139 in the ends of the floating lever. The center of the floating lever rests on and is biased upward by the valve stem 141 of the air starting valve which is biased upward to the closed position by a compression spring 143 placed between the valve body and the enlarged head portion of the valve stem. This spring is strong enough to normally hold the floating lever upward in the position shown in Figures 8 and 10 with the bottom of the lever slots contacting the lower surfaces of the pins which prevent further upward movement of the floating lever. As best shown in Figures 3 and 10, a lever 145 is rotatably supported on the left end of the shaft 121 having jaw clutch slots 147 cut in the right hand face of the hub portion of the lever. A jaw clutch element 149 having complementary clutch teeth is slidably keyed on the shaft adjacent the clutch slots in the lever for engagement therewith to lock the lever to the shaft. The lever 145 is connected by a link 151 to a lever 153 fixed on the rotatable shaft 155 of the remotely controlled electropneumatic servo mechanism 27. The details of this mechanism are not shown as it is of a well known type having two electromagnetically actuated valves shown generally at 157 and 159, which when deenergized normally open to the atmosphere both ends of a servo cylinder, not shown. The electropneumatic servo has a piston movable in the servo cylinder which is biased to a central position in the cylinder by any well known type of resilient centering means to normally hold the piston in a neutral position in the cylinder. The piston is operably connected in any well known manner to the shaft 155 and when moved in either direction from the neutral position causes rotation of the shaft 155 and lever 153 in either direction from a neutral position depending upon which electromagnetic valve is energized, which allows air to enter either end of the cylinder. Rotation of the shaft 155 and lever 153 from the neutral position in either direction acting through the link 151, lever 145 and clutch element 149 when engaged with the slots 147 in the lever 145 causes the shaft 121 and sleeve 119 keyed thereto to be rotated in either direction through an angle necessary to cause the valve operating lever 67 of the valve mechanism 65 controlling the reversible air servo mechanism 25 to be moved from the neutral position to either the ahead or astern position by means of the linkage described above connecting the arm 117 of sleeve 119 with the valve operating lever 67. This linkage, as described previously, includes the sleeve arm 117, link 95 including the resilient connection 97, and follow-up mechanism 71 connected to both the valve operating lever 67 and cross shaft 43 which is operated by the servo piston 51 of the air operated servo 25 until the engine camshafts are moved to and stopped by the piston in either the ahead or astern position in the manner previously described.

The air starting and reversing control lever 23 may also be connected to the sleeve 119 to rotate it in either direction to cause the valve operating lever 67 to be moved in the same manner as described above and through the same linkage connecting the sleeve to the valve operating lever. This control lever is rotatably mounted on the shaft 121 adjacent the upstanding portion 125 of the sleeve. The control lever has a pawl 161 slidably mounted thereon which is operated by linkage shown connecting the pawl with an auxiliary lever 163 pivoted on the control lever as best shown in Figure 3. The auxiliary lever may be moved angularly in either direction with respect to the control lever 23 to either an in or out position and held in this position by a spring biased lock button 165 slidable in a recess in the auxiliary lever and engageable in suitably spaced detent holes in the control lever whereby the pawl 161 may be moved into the slot 127 in the upstanding sleeve portion 125 by movement of the auxiliary lever to the in position, in which it may be locked by the button.

The clutch element 149 is also shown operably connected by linkage to the auxiliary lever 163, the linkage being arranged as shown in Figures 3 and 9 to cause disengagement of the clutch element 149 from the slots 147 in the lever 145 when the pawl 161 is moved into the slot 127 in the sleeve portion 125. Movement of the auxiliary lever to the out position in which it may also be locked by the button 165 causes the pawl 161 to be moved out of the slot 127 in the sleeve portion 125, and at the same time causes engagement of the clutch element 149 with the slots 147 in the lever 145 to lock it to the shaft 121.

The air starting and reversing control lever 23 also has a dog 167 slidable thereon which is spring biased for engagement with notches in a quadrant 169 fixed to the control stand to hold the control lever in a neutral position or in the ahead or astern controlling positions. The dog is moved out of the quadrant notches by the movable thumb button 171 shown in the end of the control lever in Figures 1 and 2, which is connected to the dog by linkage shown best in Figure 8. As best shown in Figure 8 the reversing and air starting lever 23 is in a central or neutral quadrant notch and the notches adjacent the neutral notch are the ahead and astern control notches. Movement of the air starting and reversing lever from the neutral position to either the ahead or astern control notches, when connected to the sleeve by means of the pawl, rotates the sleeve in either direction an amount necessary to control movement of the piston 51 of the reversible air operated servo 25 in the same manner as when the sleeve is rotated by the electropneumatic servo 27 in order to shift the engine camshafts for ahead or astern operation. Further movement of the control lever to either the ahead or astern starting control position at either end of the quadrant causes either of the rollers 133 carried in either of the arms 129 or 131 integral with the sleeve to engage and depress either end of the floating lever 135, to open the starting air valve 15 to cause ahead or astern rotation of the engine by air pressure until it fires and runs normally. No notches are provided in the ends of the quadrant and the control lever is returned to the control notches manually. This additional movement of the sleeve by the control handle 23 is permitted by the link 95 having the resilient connection 97 included therein which, as previously described, allows relative movement between the ends of this link and the lower end of the connection. It will also be evident that this resilient connection will permit differences in the amount and rate of movement between the sleeve arm 117 and levers 77 and 81 of the follow-up mechanism, when the sleeve 119 is being rotated either by the air starting and reversing lever 23 or by the remotely controlled reversible electropneumatic servo mechanism 27.

Operation of the starting air valve 15 by means of the remotely controlled electropneumatic actuator 29 will now be described. This actuator is likewise of a well known type and accordingly the details thereof about to be described are shown schematically. The actuator comprises a cylinder, a piston movable thereon, and an electromagnetically operated valve shown generally at 173 which when de-energized opens one end of the cylinder to the atmosphere, and when energized causes movement of the valve to close this end of the cylinder to the atmosphere and allow compressed air to enter this end of the cylinder. The opposite end of this cylinder from which the piston rod 175 is shown projecting is always open to the atmosphere. The piston rod is connected by means of the linkage shown to the floating lever 135. The vertical link 177 of this linkage shown connected to the floating lever is provided with a slot 179 through which a pin 181 carried by the floating lever extends. As the floating lever is normally held upward by the spring biased stem 141 of the starting air valve 15 the pin 181 on the floating lever is normally retained in contact with the upper part of the slot in the link 177 and the linkage connected between this link and the piston rod 175 is held normally in the position shown in Figures 8 and 10, the slot permitting downward movement of the floating lever 135 and pin 181 in the slot 179 of the link 177 of the linkage shown connecting the floating lever with the actuator piston rod 175 only when the air starting and reversing control lever 23 is connected to the sleeve 115 in the manner described and when this control lever moves the sleeve an amount necessary to cause either roller carried on the sleeve arms to move the floating lever downward to start the engine as described previously. Downward movement of the floating lever by the electropneumatic actuator 29 is caused by energization of the electromagnetically actuated valve 173 shown attached to the cylinder of the electropneumatic actuator which causes compressed air to enter the actuator cylinder and move the piston rod out of the cylinder. This causes the floating lever to be pulled downward by the connecting linkage, thereby causing the starting valve 15 to be opened and starting air to enter the engine cylinders in the same manner as previously described.

Interlocking means is provided to prevent downward movement of the floating lever 135 to open the air starting valve when the previously mentioned engine turning gear is being used. The engine turning gear and this interlocking means are best shown in Figure 10. The turning gear comprises a worm wheel 183 fixed to the engine flywheel, not shown, and a worm 185 fixed to the shaft 37 which is rotatably mounted in eccentric bushings 187 which are interconnected by a yoke piece 189 rotatably mounted in the engine flywheel housing. These bushings and yoke are both connected to and rotatable by the hand wheel 35 to cause engagement of the worm 185 with the worm wheel. A Bowden wire 191 is shown connected between the hand wheel 35 and a yoke 193 pivoted on the body of the starting air valve 15. This yoke has spaced upstanding arms 195 having arcuate end portions which are moved into contact with the under surface of the floating lever 135 when the hand wheel 35 is moved to engage the worm with the worm wheel to prevent opening of the starting air valve by either the air starting and reversing control lever 23 or the remotely controlled electropneumatic actuator 29. The shaft 37 may be provided with a square outer end portion for attaching a crank or other means to operate the engine turning gear and turn the engine. It will be evident that when the hand wheel is turned to disengage the worm from the worm wheel the arms 195 of the yoke will be moved out from under the floating lever to permit downward movement thereof. The above described interlocking means effectively prevents starting the engine by compressed air when the engine turning means is being used to prevent damage to the means or engine.

The means mentioned above by which the two engine injector control shafts 11 and 13 are simultaneously operated are a throttle or fuel control lever 197, shown mounted in the engine control stand, and an engine governor 199 of any well known type, shown mounted on the flywheel end of the engine.

Both ends of the injector control shafts 11 and 13 adjacent the engine control stand 123, as best shown in Figure 2, are shown connected by levers and links to a vertical link 200, the upper portion of which as shown in Figures 2 and 3 extends upward into the control stand 123 at a point immediately below the fuel control lever 197. The upper portion of the vertical link 200 is pivotally connected to a collar 201 having a slot 203 cut therein which is rotatably supported on the shaft 121 of the engine control stand 123, as best shown in Figure 3. The throttle or fuel control lever 197 is rotatably supported on the shaft 121 adjacent the collar 201 and is provided with a pawl 205 slidably mounted thereon which is operated by an auxiliary lever 207 having a lock button 209 slidably mounted therein and connecting linkage with the pawl similar to that on the reversing and air starting lever, which has been previously described, whereby this auxiliary lever may likewise be moved relative to the fuel control lever 197 and locked in either an in or out position to respectively cause the pawl 205 to be moved into or out of the slot 203 in the collar 201, thereby to connect the fuel control lever to or disconnect it from the collar and connecting linkage with the injector control shafts. The throttle lever is also provided with a dog 211 spring biased into engagement with suitable ratchet teeth formed on a quadrant 213 fixed to the control stand whereby the fuel control lever may be held in any position on the quadrant. The dog is disengaged from the ratchet teeth on the quadrant by a thumb button 215 shown in the end of the control lever and connected to the dog by suitable linkage. Movement of the fuel control lever to one end of the quadrant when connected to the collar causes both injector racks to be moved to stop fuel injection to the engine, and movement of the fuel control lever to the other end of the quadrant causes the injector control shafts to move so that the engine may be operated at maximum speed, torque and output.

The other ends of the injector control shafts, not shown, are connected in any convenient manner for operation by the engine governor 199; a resilient connection, similar to the one described in the follow-up mechanism linkage, is included in the linkage, shown generally at 97 in Figure 8 between the governor and injector control shafts to allow movement of the injector control shafts by movement of the governor through this resilient connection when the fuel control lever 197 is disconnected from the collar 203 and linkage with the injector control shafts. The resilient connection also permits relative movement of the control shafts with respect to the governor when the lever 197 is directly connected to the injector control shafts for operating the shafts directly. The governor 199 may be of any well known type which is driven by the engine having a sleeve movable in response to variations in speed and load on the engine. The sleeve may either be connected to the injector control shafts by linkage and the resilient connection mentioned above, or the governor sleeve may be connected to a pilot valve controlling any well known type of servo to cause the servo to follow movement of the sleeve in a well known manner and the servo may be connected to the injector control shafts by means of a resilient coupling such as mentioned. The governor is provided with any well known type of speed setting means for varying the speed response of the governor so that the engine may be operated at any preselected value of speed and output, depending upon the speed setting of the governor, in a well known manner. The governor speed setting means usually is of the type in which the governor spring loading may be varied. An electromagnetic motor or servo 217 of the positioning, Selsyn or telemeter type is shown fixed to the governor and is operatively connected to operate the governor setting or spring loading means. This type of electromagnetic motor or servo may be controlled remotely by any well known type of electrical control means such as a drum controller 219 or Selsyn transmitter located at any remote control position such s at RC in Figure 10, whereby the speed and torque of the engine may be varied from any part of the ship.

The above described drive and control system provides manually operable and remotely controlled power operated control means, in addition to hand operated means, interlocked in such a manner that a Diesel ship prime mover may be safely controlled from the engine room or any part of the ship to start, reverse, stop, and control operation of the engine and ship at any desired speed for quick maneuvering of the ship, and has been found to satisfy conditions of operation necessary in naval vessels.

We claim:

1. A drive and control system comprising a reversible prime mover, power operated prime mover reversing means and control means for said prime mover reversing means comprising a remotely controlled power operated device, a manually operable lever and linkage between the device and the lever, said linkage including means movable to connect either the device or the lever to operate the linkage and cause reversal of the prime mover and manually operable selector means on said lever for operating said movable means to render either said lever or said device capable of operating said linkage.

2. A drive and control system comprising a reversible prime mover, power operated prime mover reversing means, control means for said prime mover reversing means comprising a remotely controlled power operated device, a manually operable lever and linkage between the reversing means, the device and the lever, said linkage including means movable to connect either the device or the lever to operate the linkage and cause reversal of the prime mover, and hand operated prime mover reversing means including means movable to simultaneously render said power operated reversing means ineffective and to render the hand operated means operable.

3. In a drive and control system comprising a prime mover adapted to be started by air pressure, a starting air valve operable to admit starting air to the prime mover, and hand operated prime mover turning mechanism including means operable to simultaneously render the mechanism operable and prevent operation of the starting air valve.

4. In a drive and control system comprising a prime mover adapted to be started by air pressure, a starting air valve operable to admit starting air to the prime mover, manually operable means for operating the starting air valve, a remotely controlled power operated device for operating the starting air valve, and hand operated prime mover turning mechanism including means operable to simultaneously render the turning mechanism operable and to prevent operation of the starting air valve by either the manually operable means or power operated device.

5. In a drive and control system comprising a reversible prime mover having a reversible valve mechanism enabling the prime mover to be started by air pressure for operation in either direction of rotation, a starting air valve to admit air pressure to start the prime mover in either direction of rotation, power operated reversing means for reversing the prime mover valve mechanism, a remotely controlled power operated device, a manually operable starting and reversing lever, and linkage between the reversing means, the air starting valve, the device and the lever, said linkage including means movable to connect either the device or lever to move the linkage an amount necessary to cause operation of the power operated reversing means and means to allow further movement of part of the linkage only by further movement of the lever an amount necessary to operate the starting air valve.

6. In a drive and control system comprising a reversible prime mover having a reversible valve mechanism enabling the prime mover to be started by air pressure for operation in either direction of rotation, reversing means for the prime mover valve mechanism, control means for the reversing means, a starting air valve for admitting air pressure to the prime mover, a manually operable starting and reversing lever for actuating the control means for the reversing means and for actuating the air starting valve, remotely controlled means for actuating the control means for the reversing means and a remotely controlled device for operating the air starting valve.

7. In a drive and control system comprising a reversible prime mover having a reversible valve mechanism enabling the prime mover to be started by air pressure for operation in either direction of rotation, a starting air valve to admit air pressure to start the prime mover in either direction of rotation, power operated reversing means for reversing the prime mover valve mechanism, control means for said reversing means, a remotely controlled power actuated device for operating the starting air valve and means for actuating the control means for the power operated reversing means comprising a remotely controlled reversible power operated servo, a manually operable lever movable in either direction and linkage between said power operated reversing means, the remotely controlled reversible power servo and the manually operable lever, said linkage including means movable to connect either the servo or lever to move the linkage to cause operation of the power operated reversing means, and resilient means to allow further movement of part of said linkage only by further movement of the lever to cause operation of said air starting valve after reversal of said prime mover.

8. In a drive and control system for a ship comprising a Diesel prime mover having a shiftable camshaft operating the prime mover valve and fuel injection mechanism whereby the prime mover may be started by compressed air for operation in either direction of rotation, fuel regulating means to vary the speed and torque of the prime mover, and control means for the prime mover comprising a starting air valve operable to admit starting air to the prime mover, a power operated servo for shifting the camshaft, control means for the servo comprising a remotely controlled reversible power operated device, a manually operable control lever and linkage between the servo control means, the device and lever, said linkage including manually operable means to connect either the device or lever to move the linkage an amount necessary to cause the prime mover camshaft to be shifted by the servo to cause reversal of the prime mover, resilient means in said linkage enabling part of said linkage to be moved further upon further movement of the lever to actuate the starting air valve and a manually operable fuel control lever for actuating the prime mover fuel regulating means to vary the speed and torque of said prime mover.

9. In a drive and control system for a ship comprising a reversible propulsion engine adapted to be started by air pressure, said engine having reversing means, starting means comprising an air starting valve operable to admit starting air to the engine and braking means to stop rotation thereof, control means for said braking means, reversible power operated means for actuating said reversing means, control means for said power operated means, a remotely controlled power operated control device, a manually operable control lever and linkage between said braking control means, said power operated means, said device and said lever, said linkage including manually operable means for operably connecting either said device or said lever with the linkage to simultaneously cause full reversal of said engine and release of the braking means and a resilient connection also included in said linkage to permit further movement of a portion of said linkage by said lever only to cause operation of said air starting valve upon full reversal of the engine, and a second remotely controlled power operated device for actuating said air starting valve.

10. In a drive and control system for a ship comprising a Diesel engine having reversing means enabling the engine to be started by air pressure for operation in either direction, a reversible power operated servo for actuating the engine reversing means, control means for said servo, a starting air valve operable to admit starting air to the engine and means for actuating the servo control means and said starting air valve comprising a manually operable air starting and reversing control lever, a remotely controlled device and linkage between said servo control means, said control lever and said device, said linkage including a manually operable clutch for connecting either the device or control lever thereto, and a follow-up mechanism including a flexible connection between the clutch and servo control means, said follow-up mechanism comprising a lever operable by said servo, a second lever pivoted thereto and movable a limited amount with respect to the first named lever to operate the servo control means to cause operation of said servo and follow-up movement of said first named lever with respect to said second named lever and movement thereof in a direction to stop operation of said servo in a neutral, forward or reverse position, said resilient means enabling the device or control lever to be moved at a rate different than the servo and permitting the control lever to move part of said linkage an amount necessary to contact and operate the air starting valve.

KNUT O. KEEL.
CHARLES H. FIKE.
WILLIAM E. BRILL.